Sept. 9, 1924.
S. R. COOPER
SPEED SHAFT
Filed Aug. 5, 1921
1,508,085
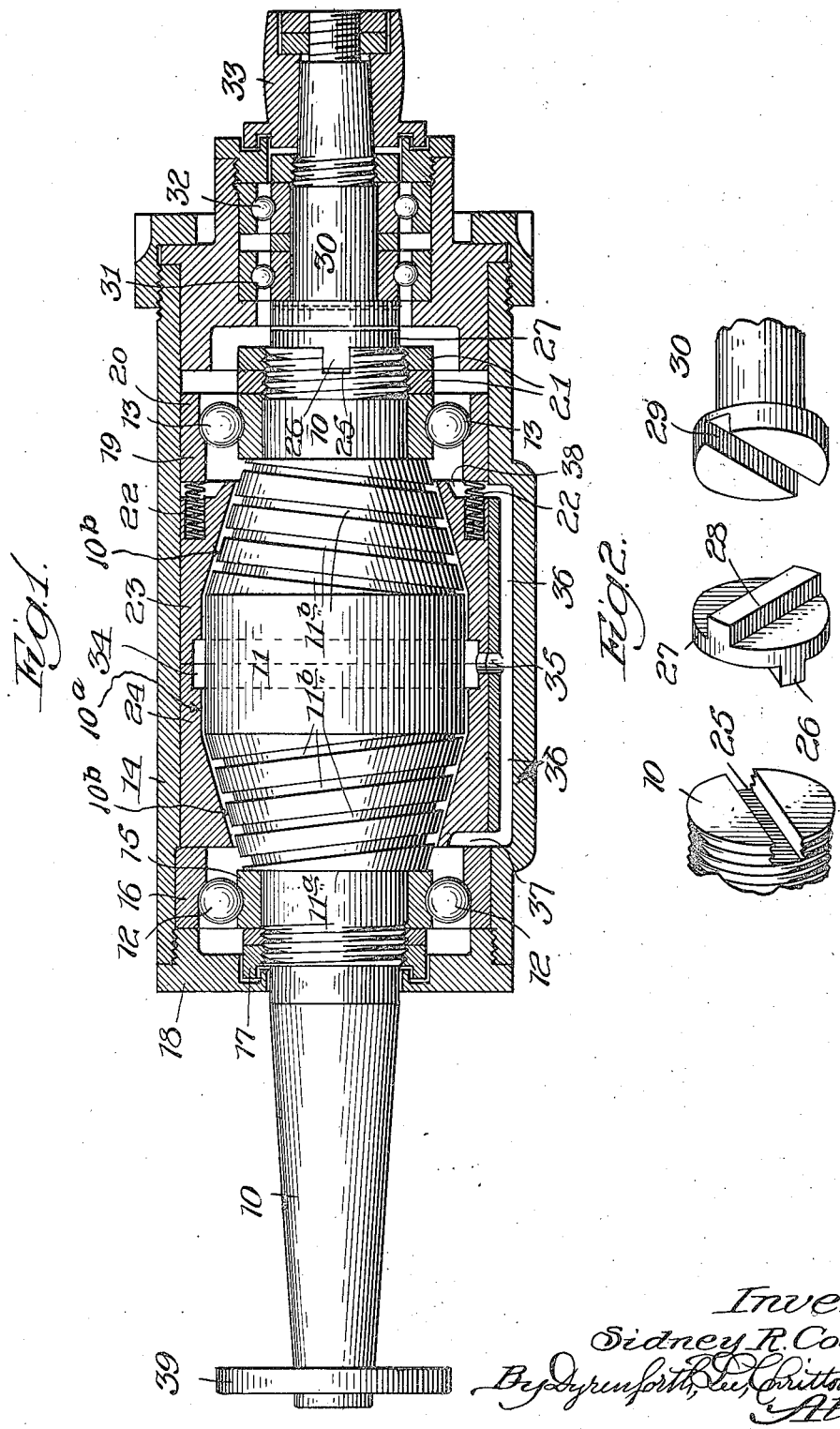

Patented Sept. 9, 1924.

1,508,085

UNITED STATES PATENT OFFICE.

SIDNEY R. COOPER, OF CHICAGO, ILLINOIS, ASSIGNOR TO U. S. BALL BEARING MANUFACTURING COMPANY, OF CHICAGO, ILLINOIS, A CORPORATION OF ILLINOIS.

SPEED SHAFT.

Application filed August 5, 1921. Serial No. 489,938.

*To all whom it may concern:*

Be it known that I, SIDNEY R. COOPER, a citizen of the United States, residing at Chicago, in the county of Cook and State of Illinois, have invented a new and useful Improvement in Speed Shafts, of which the following is a specification.

This invention relates to shafts and bearings and particularly to speed shafts and is fully described in the following specification and shown in the accompanying drawing, in which—

Figure 1 is a longitudinal section thru the bearing and Figure 2 is a fragmentary perspective of the ends of the shafts and flexible coupling therefor.

This invention is embodied in a construction having a shaft 10, the center of which is enlarged and supported by ball bearings 12 and 13 which are preferably of the combined radial and thrust type and which are carried by the housing 14. Said center has a central cylindrical surface 10$^a$ and tapered ends or inclined surfaces 10$^b$ leading thereto.

The ball bearing 12 has inner and outer race members 15 and 16, respectively. The inner race member 15 is retained against a shoulder 11$^a$ by means of the lock nuts 17 while the outer race member 16 is retained against a shoulder in the housing 14 by means of the nut 18. The bearing 12 is so arranged that it takes a thrust in one direction only, namely, from the left-hand end of the shaft, as shown in Figure 1.

The bearing 13 has similarly arranged inner and outer race members 19 and 20, respectively, the inner race member being secured on the shaft by means of lock nuts 21. The outer race member 20, however, is slidably mounted in the hollow casing 14 and is constantly pressed outwardly by means of springs 22 which are preferably secured in openings in the hollow member 23 which makes contact with a hollow member 24.

The shaft 10, as shown at the left-hand side of Figure 2, is provided with a transverse slot 25 in which is adapted to slide the key 26 formed on one side of the coupling 27. A similar key 28 is formed on the opposite side of this coupling and at right angles to the key 26 and is slidably mounted in the key-way 29 of the driving shaft.

This shaft is journaled in suitable bearings as 31 and 32 which are so mounted as to maintain the shafts 10 and 30 substantially in alignment. The shaft 30 may be driven in any suitable manner, as by means of the pulley 33.

The hollow members 23 and 24 are formed so as to leave but a small clearance about the enlargement 11 of the shaft 10. Spiral oil grooves 11$^b$ in oppositely directed relation are formed at the two ends of this enlargement so as to feed oil from points near the bearings 12 and 13 toward the internal groove 34. The surplus of oil in this groove is returned to points near the bearings thru the opening 35 and the passages 36, 37 and 38.

The outer end of the shaft 10 carries a grinding wheel 39 or other small tool. It will be apparent from the foregoing that the shaft 10 will be greatly steadied by the enlargement 11 which will act as a fly-wheel and by the film of oil between the enlargement 11 and the hollow members 23 and 24. Much of the vibration of a high-speed shaft is due to the fact that it is connected directly to the pulley which drives it and all vibration due to the belt is accordingly transmitted to the speed shaft. This is eliminated by separating the driving pulley from the speed shaft by means of the flexible coupling. The even running of the shaft is also materially increased by maintaining a uniform pressure upon the shaft bearings. This is accomplished by use of the bearings 12 and 13 which take a thrust in opposite directions and which are maintained under a uniform pressure by means of the springs 22.

While I have shown and described but a single embodiment of my invention, it is to be understood that it is capable of many modifications. Changes, therefore, in the construction and arrangement may be made which do not depart from the spirit and scope of the appended claims in which it is my intention to cover all novelty inherent in the invention as broadly as possible in view of the prior art.

I claim:

1. In combination, a shaft having an enlarged center, a radial bearing on each side of and independent of said enlarged center, a housing closely surrounding said center whereby an oil film may be maintained between the center and housing to steady the shaft, and spiral groves on said center for forcing oil into the space between the center and housing.

2. In combination, a shaft having an enlarged center with tapering sides, a radial bearing on each side of said enlarged center, and a housing closely surrounding the tapering sides of said center whereby an oil film may be maintained between the center and housing to steady the shaft.

3. In combination, a shaft having an enlarged center, said center having a cylindrical surface and substantially tapered surfaces leading thereto, said center having oppositely directed spiral grooves open at the respective tapered surfaces for the conduct of oil, a housing surrounding said center provided with means in bearing relation to said cylindrical surface and tapered surfaces, and radial bearings associated with the shaft adjacent opposite ends of said center.

4. In combination, a shaft having an enlarged center, said center having a cylindrical surface and substantially tapered surfaces leading thereto, said center having oppositely directed spiral grooves open at the respective tapered surfaces for the conduct of oil, a housing surrounding said center provided with means in bearing relation to said cylindrical surface and tapered surfaces, and radial bearings carried by the housing and associated with the shaft adjacent opposite ends of said center, said bearings being independent of said center and said means.

5. In combination, a shaft provided with an enlarged center having opposite end portions diminishing in cross sectional area toward the ends of the shaft, said center having oppositely directed spiral grooves open at the respective end portions for the conduct of oil, hollow members subject to longitudinal thrust and abutting each other at their inner ends and arranged in bearing contact with said center, and radial bearings for the shaft adjacent the outer ends of said members.

6. In combination, a shaft provided with an enlarged center having a cylindrical surface and substantially tapered surfaces leading thereto, said center having oppositely directed spiral grooves open at the respective tapered surfaces for the conduct of oil, hollow members arranged in bearing contact with said cylindrical surface and tapered surfaces, said hollow members abutting each other at their inner ends, one of said hollow members adjacent said ends having an oil groove surrounding said surface, radial bearings for the shaft adjacent the opposite ends of said center, a housing carrying said hollow members and bearings provided with an oil passage in communication with the last mentioned groove and open adjacent each bearing.

7. In combination, a shaft, radial bearings therefor, said shaft having an enlarged center intermediate said bearings providing a cylindrical surface and substantially tapered surfaces leading thereto, said center having oppositely directed spiral grooves open at the respective tapered surfaces for the conduct of oil, hollow members abutting each other at their inner ends arranged in bearing contact with said cylindrical surface and tapered surfaces, one of said hollow members abutting one of the bearings, means engaging the other of said hollow members and the other bearing to subject said hollow members to longitudinal thrust, one of said hollow members adjacent the said ends having an oil groove surrounding said cylindrical surface, and a housing carrying said bearings and said members, said housing having an oil passage in communication with the last mentioned groove and open adjacent each bearing.

SIDNEY R. COOPER.